US006323565B1

(12) United States Patent
Williams, Jr. et al.

(10) Patent No.: US 6,323,565 B1
(45) **Date of Patent: *Nov. 27, 2001**

(54) METHOD AND APPARATUS FOR OPERATING A POWER LIFTGATE IN AN AUTOMOBILE

(75) Inventors: Robert M. Williams, Jr., Grand Blanc; Patrick D. Dean, Armada; Richard L. Long, Clarkston; Ernest P. Minissale, Novi, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/413,843

(22) Filed: Oct. 6, 1999

Related U.S. Application Data

(63) Continuation-in-part of application No. 09/166,029, filed on Oct. 5, 1998, now Pat. No. 6,091,162, and a continuation-in-part of application No. 09/163,147, filed on Sep. 29, 1998, now Pat. No. 6,075,460.

(51) Int. Cl.$^{7}$ .......... B60L 1/00

(52) U.S. Cl. .......... 307/10.1; 340/825.69; 709/245

(58) Field of Search .......... 307/10.1; 340/426, 340/825.69; 701/49

(56) References Cited

U.S. PATENT DOCUMENTS

| | | | | |
|---|---|---|---|---|
| D. 334,735 | | 4/1993 | Cameron et al. . | |
| D. 398,588 | | 9/1998 | Pinardi et al. . | |
| 4,634,945 | | 1/1987 | Takemura et al. . | |
| 5,155,937 | | 10/1992 | Yamagishi et al. . | |
| 5,343,475 | | 8/1994 | Matsuda et al. . | |
| 5,563,483 | | 10/1996 | Kowall et al. . | |
| 5,627,529 | | 5/1997 | Duckworth et al. . | |
| 5,701,418 | | 12/1997 | Luitje . | |
| 6,075,460 | * | 6/2000 | Minnissale et al. | 340/825.69 |
| 6,091,162 | * | 7/2000 | Williams, Jr. et al. | 307/10.1 |

* cited by examiner

*Primary Examiner*—Josie Ballato
*Assistant Examiner*—Sharon Polk
(74) *Attorney, Agent, or Firm*—Mark P. Calcaterra

(57) ABSTRACT

A method and apparatus for operating a power liftgate in an automobile, such as a minivan, is disclosed. The invention is comprised in a control system that includes a user input interface for receiving power liftgate actuation requests from a user. The actuation signals are carried to a body control module (BCM) where the request is broadcast to a power liftgate module (PLGM) over a serial data bus communications network meeting the SAE J1850 multiplex communications protocol standard. Upon receipt of the actuation message, the PLGM monitors several operating conditions of the automobile and makes a determination whether or not to carry out the power liftgate activation request. Power liftgate actuation is controlled by the PLGM via electric motors located at or near the liftgate. The user input interface includes interior switches as well as a RKE system.

18 Claims, 7 Drawing Sheets

METHOD AND APPARATUS FOR OPERATING A POWER LIFTGATE IN AN AUTOMOBILE

CROSS-REFERENCE TO RELATED APPLICATION

This is a continuation-in-part of U.S. patent application Ser. No. 09/166,029, filed Oct. 5, 1998 and entitled, “Method and Apparatus for Operating a Power Sliding Door in an Automobile” which is now issued as U.S. Pat. No. 6,091,162, and a continuation-in-part of co-pending U.S. patent application Ser. No. 09/163,147, filed Sep. 29, 1998 and entitled “Method for Operating a Power Sliding Door and a Power Liftgate using Remote Keyless Entry System” which is now issued as U.S. Pat. No. 6,075,460.

BACKGROUND OF THE INVENTION

1. Field of the Invention

The present invention relates generally to the remote operation of powered convenience accessories in automobiles, and specifically automobiles having a power sliding door and/or a power liftgate. More particularly, the present invention relates to the method and apparatus for electronically controlling the operation of a power sliding door and/or a power liftgate in a minivan including, in one aspect of the invention, the use of a remote keyless entry system.

2. Discussion

It is well-known that electronics have been employed in automobiles to encompass a wide variety of automotive systems and accessories. In today’s automobiles, electronically controlled convenience accessories such as power operated central locking systems for doors, trunk and gas tank cap, power adjustable seats and steering wheels, power windows and doors and theft deterrent devices, among others, are commonplace.

Electronic control systems routinely employ microcontrollers and/or microprocessors that are programmed to interact with a variety of sensors and actuators to sense, measure, monitor and control nearly every functional aspect of automobile operation. Often, several or more control systems combine together to comprise a single vehicle electrical system and each control system is interdependent upon one or more others for data or performance in order to accomplish its tasks and objectives. As such, the control systems are designed to share data with one another, as necessary, across one or more communication interfaces within the vehicle electrical system. For reasons of design cost, complexity, reliability and functionality, as new control systems are subsequently introduced into a vehicle electrical system, It is desirable to minimize the additional circuitry and programming that is required to implement the new control system.

Among automobiles today, minivans enjoy a sustained popularity in the marketplace, and have done so since their introduction in the early 1980’s. Minivans often include one or more sliding doors, as well as a rear liftgate for access to the vehicle.

It has become desirable to employ a power convenience device for automatically operating (e.g., opening and closing) the sliding doors and liftgates of minivans in order to avoid having the vehicle users manually open and close these heavy doors.

Thus, a primary objective of the present invention is to provide a power convenience device which substitutes for the use of physical effort on the part of the automobile user to open and close a sliding door or liftgate of a minivan.

Another objective of the present invention is to provide an electronic control system for operating power sliding doors and/or a power liftgate in a minivan with a minimal amount of electrical circuitry being added to the overall vehicle electrical system and which can take advantage of controllers, switch inputs and an SAE Standard data bus already hardwired within an automobile.

In addition, another objective of the invention is to accommodate the monitoring of multiple inputs for the same function by a body control module and subsequently broadcasting the information over a standard data bus to a control module controlling the operation of the sliding door or liftgate.

Still another objective of the present invention is to provide a remote keyless entry (RKE) system as a user input interface to a power sliding door or liftgate control system which enables a sliding door or liftgate to be opened remotely using a remote keyless entry device. A further objective of the present invention is to provide such a remote keyless entry system that allows a single RKE user input device, such as a key fob, to be utilized for a variety of combinations of power door and liftgate options that may be incorporated in a minivan.

SUMMARY OF THE INVENTION

Accordingly, the present invention is directed to method and apparatus for operating a power sliding door or liftgate in an automobile. An electronic control system includes a user input interface for receiving sliding door or liftgate actuation requests from a user. The actuation signals are carried to a body control module (BCM) where the request is broadcast either to a power sliding door module (PSDM) or a power liftgate module (PLGM), as appropriate, over a serial data bus communications network meeting the SAE J1850 multiplex communications protocol standard. Upon receipt of an actuation message the PSDM (or PLGM) monitors several operating conditions of the automobile and makes a determination whether or not to carry out the power sliding door (or power liftgate) activation request. Power sliding door actuation is controlled by the PSDM via electric motors located at or near the power doors. Power liftgate actuation is controlled by the PLGM also by electric motors located at or near the power liftgate. The user input interface includes interior switches as well as a RKE system.

One advantage of the present invention is the ability to incorporate a power sliding door or liftgate control system in an automobile with a minimal amount of electrical circuitry thereby reducing packaging size and costs.

This invention also has the advantage of being able to both unlock and open a door or liftgate with the single push of one button from both inside and outside the vehicle.

This invention also has the advantage of using only one key fob for an RKE user interface regardless of how many power door and/or liftgate features are included on the vehicle.

Various other features and advantages will become apparent to one skilled in the art after having the benefit of studying the teachings of the specification, the drawings, and the claims.

BRIEF DESCRIPTION OF THE DRAWINGS

The various features and advantages of the present invention will become apparent to one skilled in the art upon reading the following specification, in which.

DESCRIPTION OF THE PREFERRED EMBODIMENT

It should be understood from the outset that while the drawings and following discussion relate to a particular embodiment of the present invention, this embodiment merely represents what is presently regarded as the best mode of practicing the invention and other modifications may be made to the particular embodiment without departing from the spirit and scope of the invention.

Referring to FIGS. 1 through 4, simplified block diagrams of an electronic control system 10 of the present invention and process flow diagrams illustrating its method of operation for actuating power doors and/or a liftgate in an automobile, such as a minivan or the like, are illustrated. As is well-known, minivans can include either one or two side sliding doors (e.g. a driver's side and/or a passenger's side) and a rear liftgate. Also, interior overhead consoles in minivans are common which house electronic switches that are easily accessed by the vehicle occupants to actuate vehicle accessories. Additionally, user-actuated switches are located on the B-pillar of the vehicle, that is, a roof structural support member that is located between the front and rear passenger compartments.

A control system 10 as embodied in the present invention is one part of the complete vehicle electrical system (not shown) which generally includes numerous electrical feeds, output loads, sensors and control modules. Consequently, in order for the control system 10 of the present invention to operate as intended, all the related components in the vehicle electrical system must provide accurate information, as necessary, for satisfying the logical functional parameters required for carrying out a user's request for a power sliding door and/or power liftgate operation.

The control system 10 controls the operations of opening and closing of a power sliding door or power liftgate convenience accessories by directing the function of the several sliding door and liftgate motors within the vehicle. Also, the control system 10 provides the vehicle occupants with audible warning signals, either preceding or simultaneous with carrying out the sliding door or liftgate activation requests by the user(s).

Figure 1:
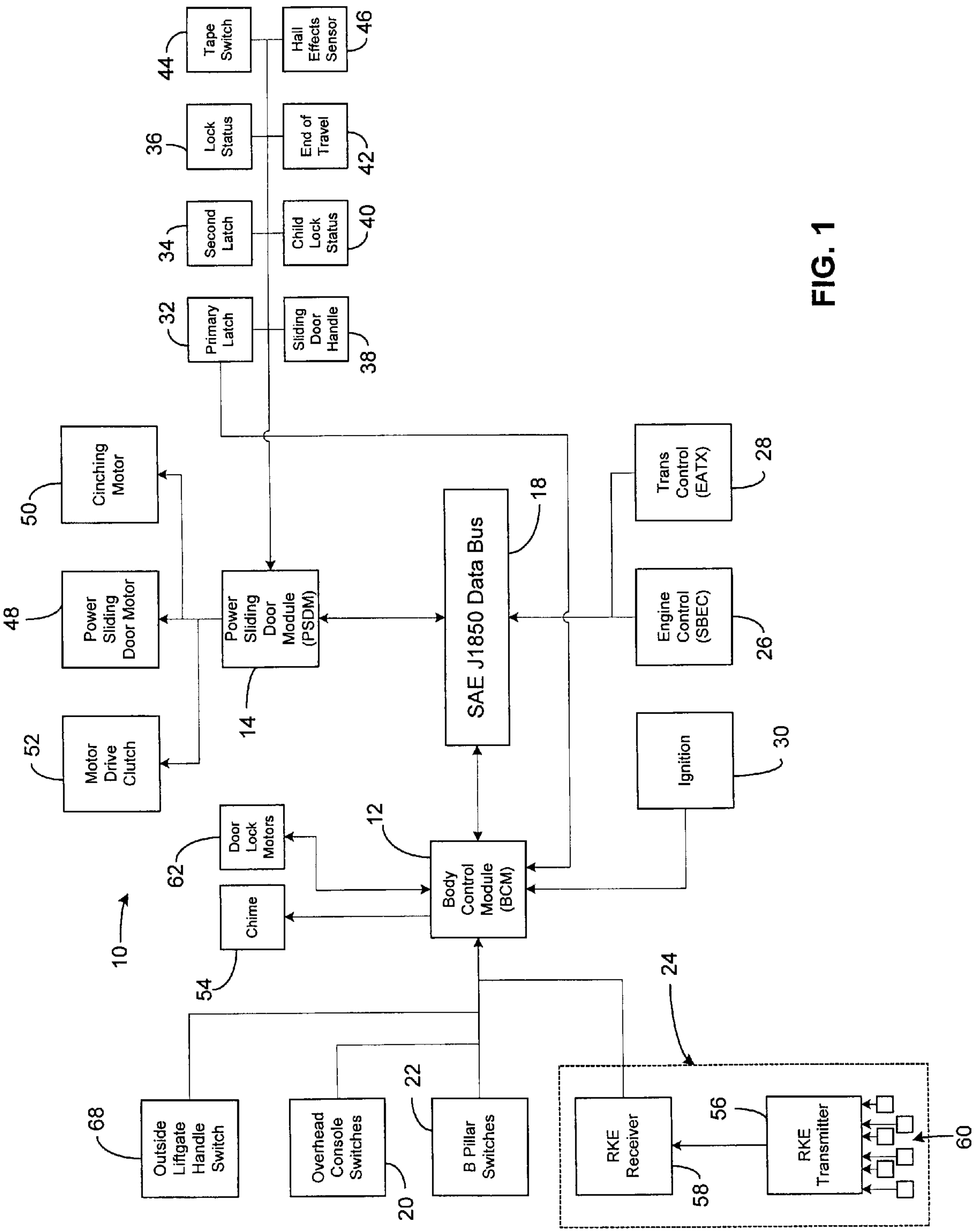
FIG. 1 is a simplified block diagram of an electronic control system of the present invention showing the features for operating power sliding doors in an automobile.
Figure 2:
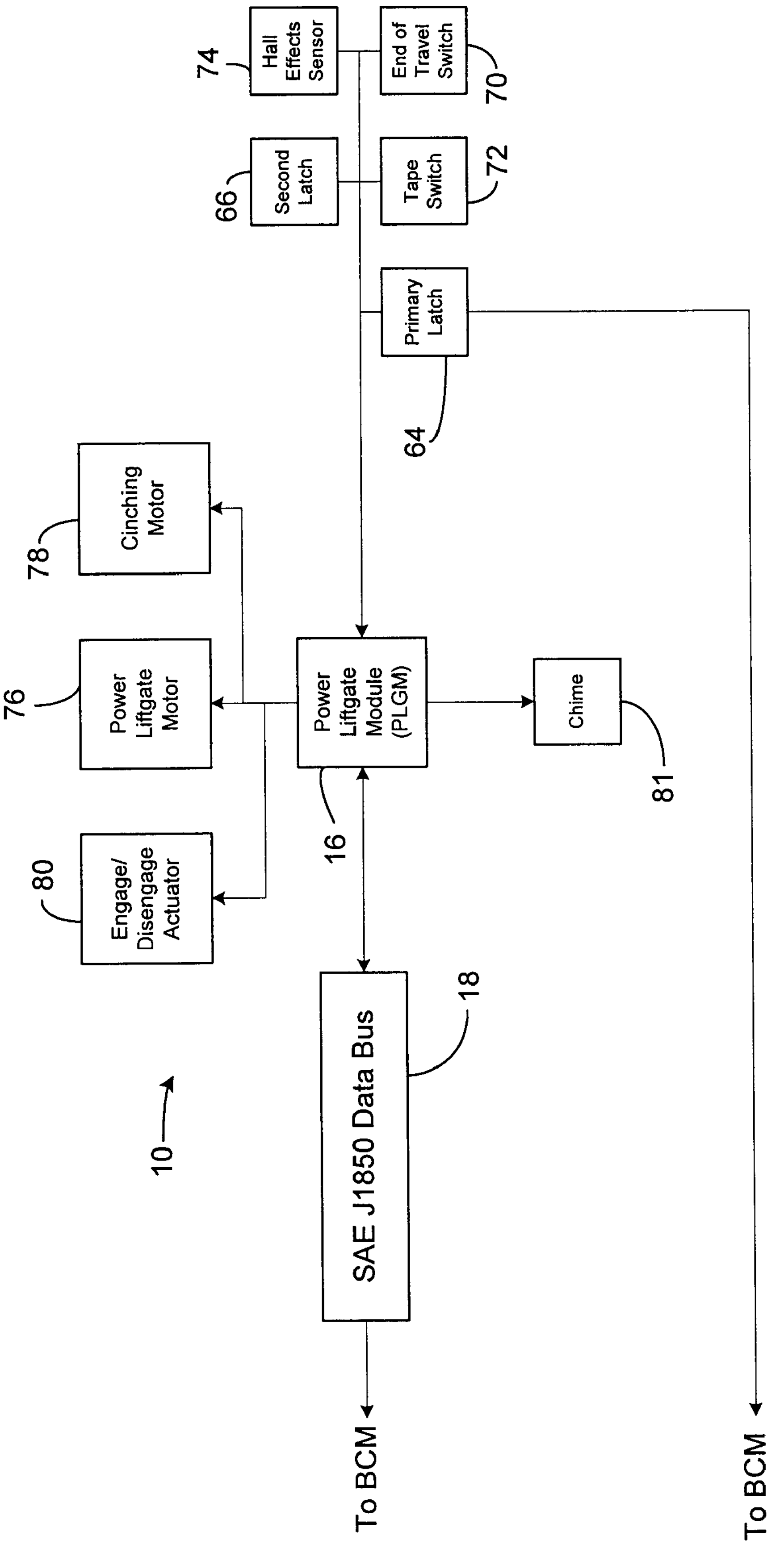
FIG. 2 is a simplified block diagram of the electronic control system of the present invention showing the additional features for operating a power liftgate in an automobile.

The control system 10 is shown in FIGS. 1 and 2 to comprise several control modules including a body control module (BCM) 12, a power sliding door module (PSDM) 14 and a power liftgate module (PLGM) 16. The control modules 12, 14, 16 are either microcontroller or microprocessor-based, the PSDM 14 and PLGM 16 being microprocessor-based with a suitable microprocessor coming, for example, from the MC68HC08 family of microprocessors manufactured by Motorola. The control modules 12, 14, 16 communicate with each other over an electronic serial data bus communications network 18, such as the Society of Automotive Engineers (SAE) multiplex (MUX) protocol standard J1850. The modules 12, 14, 16 can receive switch inputs and sensor information, as well as control motors to various components of the vehicle.

Additionally, the control system 10 includes a plurality of input actuation devices for the power doors and/or liftgate. Diagrammatically illustrated in FIG. 1 are overhead console switches 20, B-pillar switches 22, and outside liftgate handle switch 68, as well as a remote keyless entry (RKE) system 24. The switches 20, 22, 68 and RKE system 24 are operable in response to user inputs for activation of the power door or liftgate vehicle accessories.

According to the present invention, function of the power door and/or liftgate features is also contingent upon inputs from several other control modules and switches not directly part of the control system 10. For example, also broadcasting information to the control system across the SAE J1850 data bus are a single board engine controller (SBEC) 26, an electronic automatic transmission controller (EATX) 28 and an ignition switch 30.

A group of switches and sensors, including a primary latch switch 32, a secondary latch switch 34, a lock status switch 36, a sliding door handle switch 38, a child lock status switch 40, an end of travel switch 42, a tape switch 44 and a Hall effects sensor 46 communicate information to the PSDM 14 that determines power sliding door accessory operability. A separate group of switches and sensors, including another primary latch switch 64, secondary latch switch 66, outside door handle switch 68, end of travel switch 70, tape switch 72 and Hall effects sensor 74 communicate information to the PLGM 16 that determines power liftgate accessory operability.

In regard to the present invention, the BCM 12 monitors for user activation requests for the power door and/or liftgate accessories from the RKE system 24, the overhead console switches 20, the B-pillar switches 22 and the outside liftgate handle switch 68. In addition, the BCM 12 is able to receive and monitor broadcasts from the SBEC 26 and EATX 28.

According to the method of the present invention, certain conditions are required to be satisfied for the BCM 12 to make a determination to send activation messages to the PSDM 14 or PLGM 16 over the J1850 data bus 18, as required. The BCM 12 provides J1850 data bus 18 messages to various control modules in the vehicle electronics system, including the PSDM 14 and PLGM 16, as necessary in response to power accessory activation requests from the user. The BCM 12 sends information, such as switch status, and inputs, such as power sliding door and power liftgate activation requests from the overhead console switches 20, the B-pillar switches 22, the outside liftgate handle switch 28 and the RKE system 24, to the PSDM 14 and PLGM 16, as appropriate.

The BCM 12 also operates a chime 54 of three single tones when a successful J1850 data bus 18 broadcast by the BCM 12 of an interior switch button press has been communicated to the PSDM 14.

In order to eliminate ignition-off-draw, the BCM 12 provides a wake-up ground signal to the PSDM 14 or PLGM 16, as necessary. During low power mode, the BCM 12 periodically wakes-up and monitors for a newly active input. Upon a new signal being sensed, the BCM 12 exits its low power "sleep" state and enters its normal "awake" state. When the BCM 12 is awakened, the BCM 12, in turn, wakes up the PSDM 14 and PLGM 16. However, the BCM 12 will not wake up as a result of any message from of the interior switches (e.g., the overhead console switches 20 and the B-pillar switches 22) after a predetermined "timeout" period, such as five minutes for example, has elapsed subsequent to the vehicle ignition being cycled from "on" to "off." When the BCM 12 goes into "sleep" mode, it removes the wake-up ground signal to the PSDM 14 and PLGM 16 causing them to also go into "sleep" mode. At all other times (e.g., when the wake-up ground signal is being applied by the BCM 12 to the PSDM 14 and PLGM 16) the PSDM 14 and PLGM 16 are in the operating mode.

Both the PSDM 14 and PLGM 16 communicate over the J1850 data bus 18 with the following other vehicle controls: the body control module 12, the electronic automatic transmission controller 28, and the single board engine controller 26. Through this interface, the PSDM 14 and PLGM 16 provide memory storage, instructions, and diagnostics. The PSDM 14 and PLGM 16 are operational when a wake-up (power-up) ground signal is received from the BCM 12, independent of the ignition switch 30 power.

The PSDM 14 drives three devices, the sliding door motor 48 the cinching motor 50 and the motor drive clutch 52. When a door activation request is broadcast from the BCM 12 over the J1850 data bus 18 to the PSDM 14, the PSDM 14 interprets the necessary inputs and outputs from its control modules, switches and sensors. Based on that information, the PSDM 14 makes a determination of whether to actuate the power sliding door motor 48 to open or close, as appropriate, or to neglect to actuate the power sliding door.

If the PSDM 14 detects an increase in door effort as the sliding door is being actuated, the PSDM 14 will suspect that there is an obstruction in the door's path and reverse the direction of travel of the sliding door. If two consecutive obstructions occur, the PSDM 14 shuts down and stalls the sliding door motor 48.

The power cinching motor 50 is controlled by the PSDM 14. During a sliding door close cycle, when the sliding door is almost closed, such as within about the last several millimeters of door travel, the PSDM 14 provides power to the cinching motor 50 to close the sliding door into a primary "closed" position.

The PSDM 14 also controls the motor drive clutch 52. When a power sliding door activation request is sent from the BCM 12 via J1850 data bus 18 to the PSDM 14, the PSDM 14 again interprets the necessary inputs and outputs from the control modules, switches and sensors. Based on that information, the PSDM 14 makes a determination of whether or not to actuate the motor drive clutch 52 to operate the sliding door gear mechanism.

The PSDM 14 receives speed pulse and battery voltage level inputs over the J1850 data bus 18 from the SBEC 26. The PSDM 14 also receives gear position park-reverse-neutral-drive-low (PRNDL) information over the J1850 data bus 18 from the EATX 28.

In addition, the PSDM 14 monitors switches and sensors for state conditions, whose data are utilized to determine if and when sliding door operations are initiated and carried out by the PSDM 14.

The sliding door handle switch 38 is a low current switch to ground that is activated when a vehicle occupant manually operates either the interior or exterior sliding door handles. When the PSDM 14 receives a ground signal input from the door handle switch 38, this indicates a request of the PSDM 14 to disengage the motor drive clutch 52 and turn off the sliding door motor 48. This feature allows a user to stop the powered activation of a sliding door if desired, such as in the case of an emergency situation. The control system 10 still enables the power sliding doors to be fully manually operational from the interior and exterior door handles.

The end of travel switch 42 is a low current switch to ground that is activated when the power sliding door is fully open. When the PSDM 14 receives a signal input from the end of travel switch , the PSDM 14 stops the sliding door open motion and shuts down the sliding door motor 48.

The child lock switch 40 is a low current switch to ground that is activated when the child lock safety feature on the door is engaged. When the PSDM 14 receives a ground signal input from a child lock switch 40, the PSDM 14 subsequently disregards power sliding door activation requests originating from the corresponding sliding door's B-pillar switch 22. However, activation requests from all other switches and the RKE system 24 remain valid. This feature provides an additional safety function for children occupants of the vehicle.

The primary and secondary latch switches 32, 34 are low current switches to ground that are associated with the physical position of the sliding doors. When the PSDM 14 receives a ground signal input from a primary latch switch 32, the PSDM 14 stops and shuts down the power cinching motor 50. When the input from a secondary latch 34 is grounded, the PSDM 14 disengages the sliding door drive motor 48 and activates the cinching motor 50. Obstructions to the travel of the power sliding door in between the secondary 34 and primary 32 latch positions are detected with a tape switch 44, as discussed further herein. The primary and secondary latch switches 32, 34 are cooperable with a ratchet and pawl mechanism on the sliding door to determine whether the sliding door latch is open or closed. The BCM 12 receives door ajar status from the primary latch switch which is hardwired to the BCM 12.

The lock switch 36 is a low current switch to ground that is activated when the sliding door lock is in the "locked" position. When the PSDM 14 receives a ground signal input from a lock switch 36, the PSDM 14 reads the lock switch 36 status and determines whether or not to operate the power door in response to a door activation request. If the door is locked, the PSDM 14 will not activate the sliding door motor 48 to operate the door on a B-pillar switch 22 activation. In that case, the door has to be in an unlocked state to operate. However, a sliding door activation request received from the overhead console switch 20 or the RKE system 24 will initiate a sliding door activation because upon RKE system 24 actuation, the BCM 12 first unlocks the door and then broadcasts a message to the PSDM 14 to actuate the power sliding door. This prevents the sliding door motor 48 from becoming damaged due to trying to open a locked door.

The tape switch 44 is an analog current switch to ground which is activated when an obstruction blocks travel of the power sliding door during its actuation. When the PSDM 14 receives an analog signal input from the tape switch 44, the PSDM 14 instructs the sliding door motor 48 and/or cinching motor 50 to first stop and then reverse the direction of travel of the power sliding door that is obstructed.

The PSDM 14 drives the Hall effects sensor 46. The PSDM 14 monitors and controls the position and speed of the door motion by providing power to the Hall effects sensor 46.

The PLGM 16 communicates over the J1850 data bus 18 with the BCM 12. The PLGM controls the power liftgate actuation via electric motors located at or near the liftgate.

The PLGM 16 also drives three devices, the liftgate motor 76, the cinching motor 78 and the motor drive clutch 80. When a liftgate activation request is broadcast from the BCM 12 over the J1850 data bus 18 to the PLGM 16, the PLGM 16 interprets the necessary inputs and outputs from its control modules, switches and sensors. Based on that information, the PLGM 16 makes a determination of whether to actuate the power liftgate motor 76 to open or close, as appropriate, or to neglect to actuate the power liftgate. When a successful activation request has been made by the liftgate handle user input switch 68, the PLGM 16 operates a chime 81 of three single tones to indicate operation of the power liftgate function.

If the PLGM 16 detects an increase in door effort as the liftgate is being actuated, the PLGM 16 will suspect that there is an obstruction in the liftgate's path and reverse the direction of travel of the liftgate.

The power cinching motor 78 is controlled by the PLGM 16. During a liftgate close cycle, when the liftgate is almost closed, such as within about the last several millimeters of liftgate travel, the PLGM 16 provides power to the cinching motor 78 to close the liftgate into a primary "closed" position.

The PLGM 16 also controls the motor drive clutch 80. When a power liftgate activation request is sent from the BCM 12 via J1850 data bus 18 to the PLGM 16, the PLGM 16 again interprets the necessary inputs and outputs from the control modules, switches and sensors. Based on that information, the PLGM 16 makes a determination of whether or not to actuate the motor drive clutch 80 to operate the power liftgate gear mechanism.

The PLGM 16 receives speed pulse and battery voltage level inputs over the J1850 data bus 18 from the SBEC 26. The PLGM 16 also receives gear position park-reverse-neutral-drive-low (PRNDL) information over the J1850 data bus 18 from the EATX 28.

In addition, the PLGM 16 monitors switches and sensors for state conditions, whose data are utilized to determine if and when liftgate operations are initiated and carried out by the PLGM 16.

The end of travel switch 70 is a low current switch to ground that is activated when the power liftgate is fully open. When the PLGM 16 receives a signal input from the end of travel switch 70, the PLGM 16 stops the liftgate open motion and shuts down the liftgate motor 76.

The primary and secondary latch switches 64, 66 are low current switches to ground that are associated with the physical position of the liftgate. When the PLGM 16 receives a ground signal input from a primary latch switch 64, the PLGM 16 stops and shuts down the power cinching motor 78. When the input from a secondary latch switch 66 is grounded, the PLGM 16 disengages the liftgate drive motor 76 and activates the cinching motor 78. Obstructions to the travel of the power liftgate in between the secondary 66 and primary 64 latch positions are detected with a tape switch 72, as discussed further herein. The primary and secondary latch switches 64, 66 are cooperable with a ratchet and pawl mechanism on the liftgate to determine whether the liftgate latch is open or closed. The BCM 12 receives liftgate ajar status from the primary latch switch which is hardwired to the BCM 12.

The tape switch 72 is an analog current switch to ground which is activated when an obstruction blocks travel of the power liftgate during its actuation. When the PLGM 16 receives an analog signal input from the tape switch 72, the PLGM 16 instructs the liftgate motor 76 and/or cinching motor 78 to first stop and then reverse the direction of travel of the power liftgate that is obstructed.

The PLGM 16 drives the Hall effects sensor 74. The PLGM 16 monitors and controls the position and speed of the liftgate motion by providing power to the Hall effects sensor 74.

As already mentioned, the control system 10 utilizes several user-operated input mechanisms for initiating sliding door and liftgate activation requests. These input mechanisms are overhead console switches 20, B-pillar switches 22, an outside liftgate handle switch 28 and a remote keyless entry (RKE) system 24.

The overhead console switches 20 provide the vehicle occupants with switches for activation of power sliding doors and/or liftgate accessories or the ability to lock-out the interior switches 20, 22. The overhead console switches 20 are low current and have resistance values to indicate open and short circuit conditions. The overhead console switches 20 have four switch combinations: left sliding door, right sliding door, liftgate, and lockout. Each sliding door or liftgate switch is momentary and the lockout feature is a latching switch. If the lockout feature is enabled, all the interior switches, including both the overhead console switches 20 and the B-pillar switches 22 are disabled. The user then must disable the lockout feature to regain use of the interior switches 20, 22.

The user selects an overhead console switch 20 function by means of a resistive multiplexed signal to the BCM 12. The BCM 12 broadcasts a message over the J1850 data bus 18 to the PSDM 14 or PLGM 16, as necessary, to actuate the vehicle accessory function selected by the user. Upon the press of an overhead console switch 20, the BCM 12 receives the switch input and broadcasts a message to the PSDM 14 or PLGM 16 indicating the button had been pressed.

The B-pillar switches 22 provide the vehicle occupants with a switch for a power sliding door activation request. Depending upon the configuration of the vehicle, there are either one or both of two B-pillar switches, a left B-pillar switch and a right B-pillar switch. The B-pillar switches 22 are low current switches that possess resistance values to indicate open and short circuit conditions. The B-pillar switches 22 are hardwired directly to the BCM 12. When the user selects a B-pillar switch 22 function, the BCM 12 broadcasts a message to the PSDM 14 over the J1850 data bus 18 indicating that a button has been pressed.

The RKE system 24 is, itself, a vehicle convenience accessory that is intended to allow a user to avoid having to manually operate a key in a mechanical lock mechanism to open a sliding door or liftgate by enabling the user to remotely access a vehicle from a short distance away from the vehicle. The RKE system 24 generally comprises a transmitter 56 and a receiver 58.

The transmitter 56 is usually packaged in a small, hand-held fob that also serves as a key chain. The transmitter 56 of the present invention includes six input switches or input buttons 60. Interface of the RKE transmitter 56 to the vehicle and, consequently, to the control system 10, is by radio frequency (RF) transmissions to the RKE receiver 58. Of course, the transmission signal can be at other conventionally used frequencies, such as the infrared, as one example. Upon selection and activation of an input button 60, the RKE transmitter 56 transmits a radio frequency signal to a RKE receiver 58 located in the vehicle's electrical system. The RKE receiver 58 can employ any of a number of well-known radio frequency reception technologies, such as super-heterodyne technology as one example. In the RKE receiver 58, the transmissions are received, interpreted and translated into specific messages. The messages are then sent from the RKE receiver 58 to the BCM 12 by a serial data link.

Included in the functions of the RKE system 24 are the locking and unlocking of the doors of the vehicle, locking and unlocking of the liftgate, opening and closing of the power sliding doors, opening and closing of the power liftgate, and a "panic" mode. Also, operator programmable features may be incorporated in the RKE transmitters 56, such as the sounding of a horn chirp, unlocking all the doors of the vehicle on a first button press or alternatively unlocking only the driver's side doors on a first button press and all the doors of the vehicle on a second button press; recalling operator stored preferences associated with other vehicle convenience accessory systems (if the vehicle is so equipped), such as preprogrammed seat and mirror locations. The overhead console 20 lockout feature has no effect on RKE system 24 operation.

In addition, the RKE system 24 initiates feedback to the operator in the manner of, for example, flashing lights, to readily confirm to the operator from a distance that the RKE system 24 is operating according to the operators input requests.

The RKE system 24 components are preprogrammed for an individual vehicle prior to installation of the RKE system 24 during the manufacture of the vehicle. However, the RKE system 24 may likewise be programmed at the vehicle assembly plant or by a service facility.

The outside liftgate handle switch 28 enables, under circumstances described further herein, an operator to control power liftgate operation by manually operating the liftgate handle. The outside liftgate handle switch 28 is a low current, momentary switch having a resistance value to indicate open and short circuit conditions. The outside liftgate handle switch 28 is hardwired directly to the BCM 12. When the user operates the outside liftgate handle, the BCM 12 sends a message to the PLGM 16 over the J1850 data bus 18 indicating that the liftgate handle switch has been activated. If the liftgate is unlocked, the PLGM 16 activates the cinching motor 50 release the liftgate. The user is then free to manually operate the liftgate. If the liftgate is locked, the PLGM 16 will prohibit opening of the liftgate.

The outside liftgate handle switch 28 also effects operation of the liftgate during both the liftgate opening and closing cycles. If the outside liftgate handle switch 28 is activated while the liftgate is closing, the PLGM 16 causes the power liftgate motor 76 to reverse the direction of travel of the liftgate. If the outside liftgate handle switch 28 is activated while the liftgate is opening, the PLGM 16 disengages the motor drive clutch 80 and turns off the liftgate motor 76. This feature allows a user to discontinue the powered activation of a liftgate to enable the power liftgate to be fully manually operational from the outside liftgate handle.

The method of operation of the control system 10 of the present invention is explained as follows. While in the normal operating mode (e.g., an awake state), the BCM 12 monitors the overhead console switches 20, the B-pillar switches 22, the RKE system 24 and the outside liftgate handle switch 28 for a change of state. Upon a successful switch activation from either the overhead console switches 20 or the B-Pillar switches 22, the BCM 12 broadcasts a message over the J1850 data bus to the PSDM 14 or PLGM 16 indicating that there has been a sliding door or liftgate activation request.

Figure 3A:
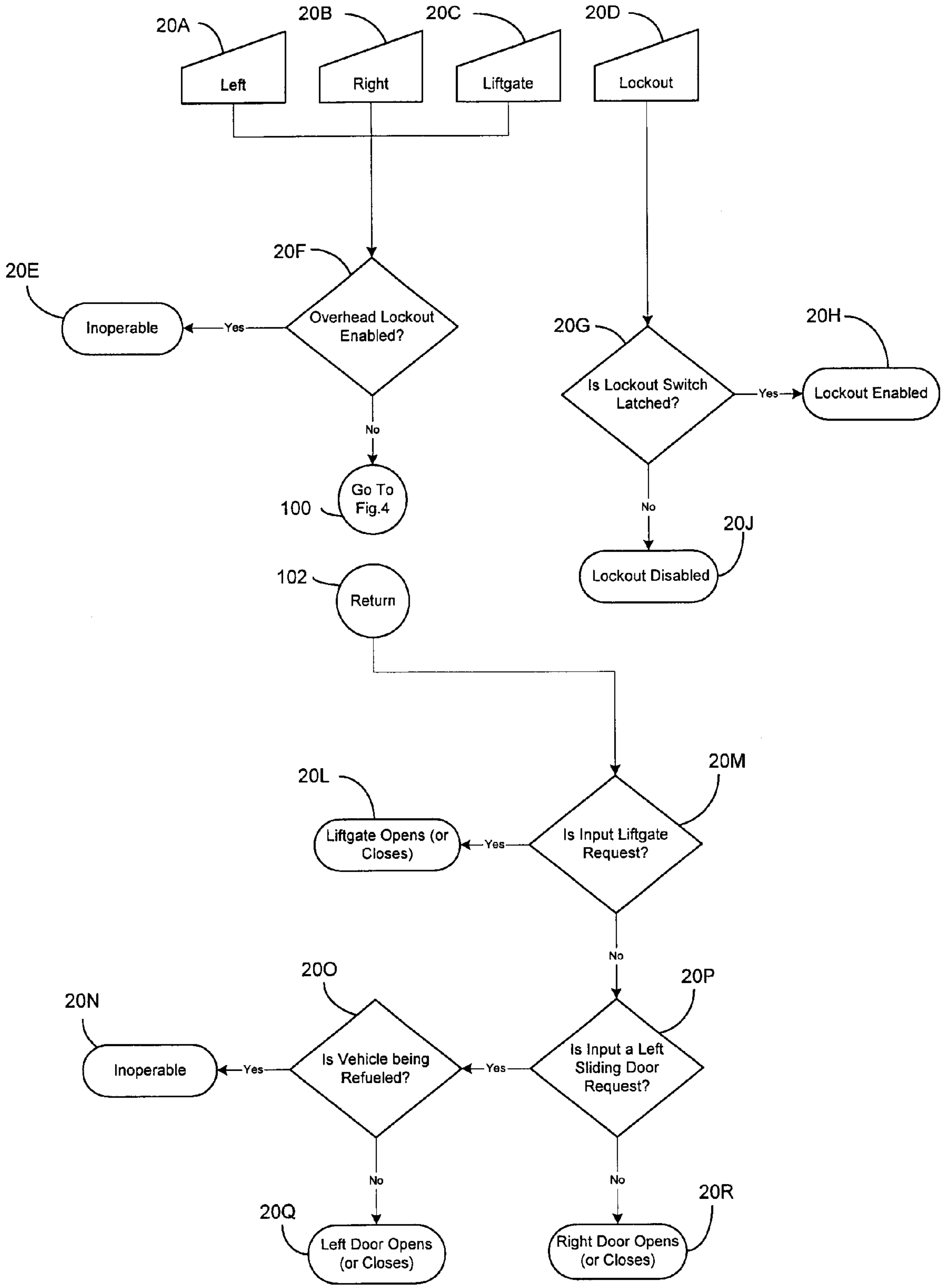
FIG. 3A is a process flow diagram of the electronic control system of the present invention showing a method for operating power sliding doors and a power liftgate in an automobile utilizing the overhead console user input switches.
Figure 3B:
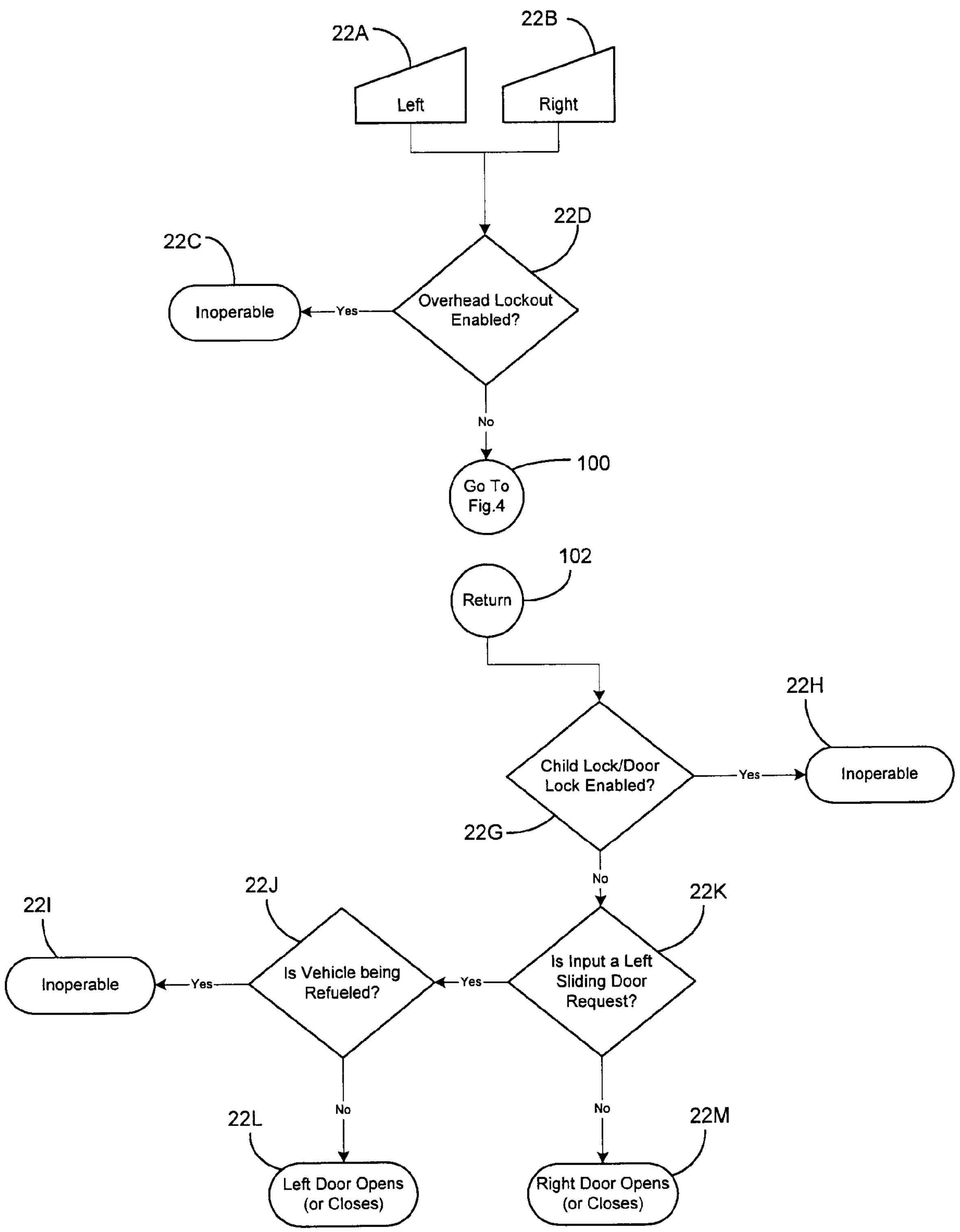
FIG. 3B is a process flow diagram of the electronic control system of the present invention showing a method for operating power sliding doors in an automobile utilizing the B-pillar user input switches.
Figure 3C:
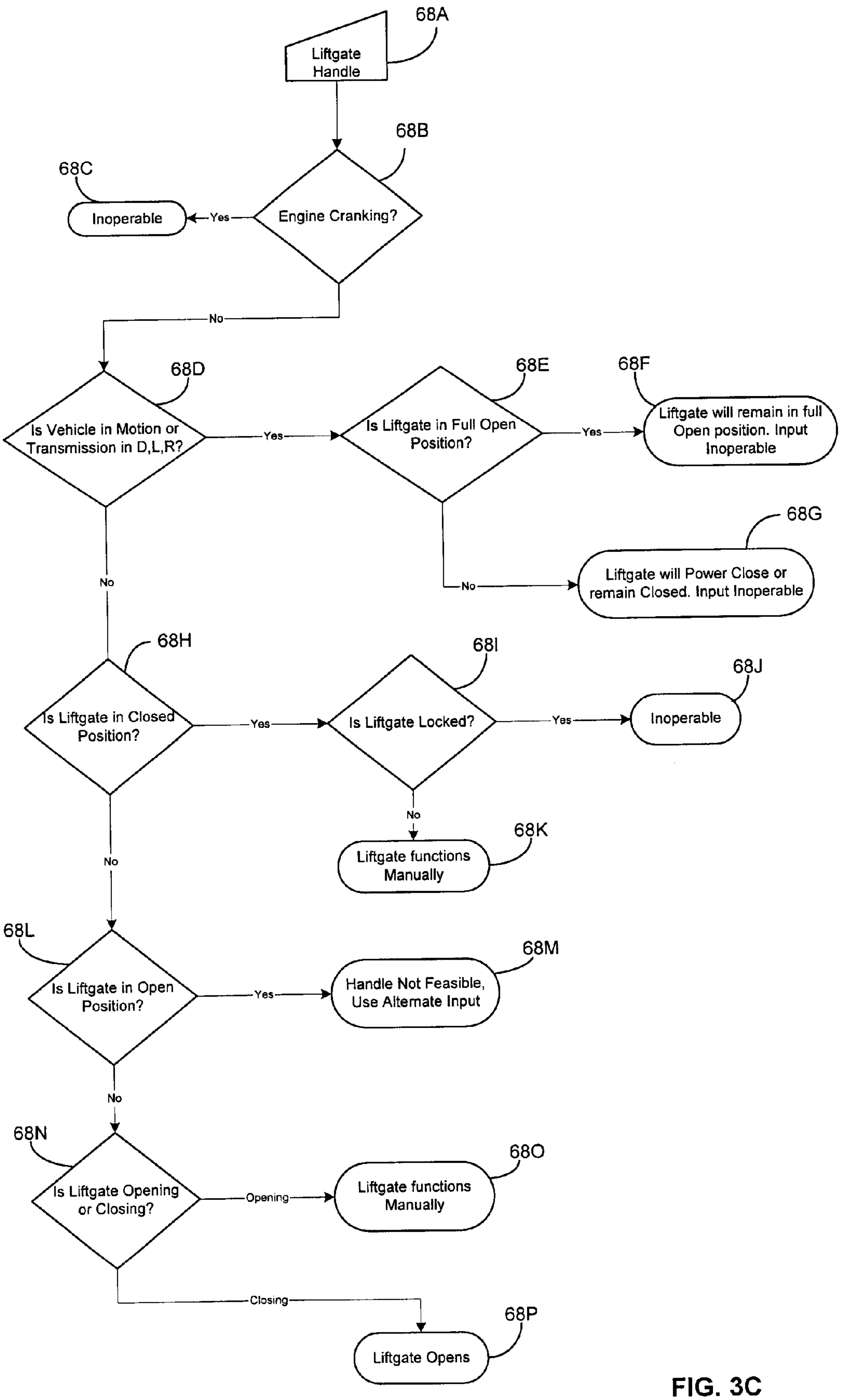
FIG. 3C is a process flow diagram of the electronic control system of the present invention showing a method for operating a power liftgate in an automobile utilizing the outside liftgate handle user input switch.
Figure 3D:
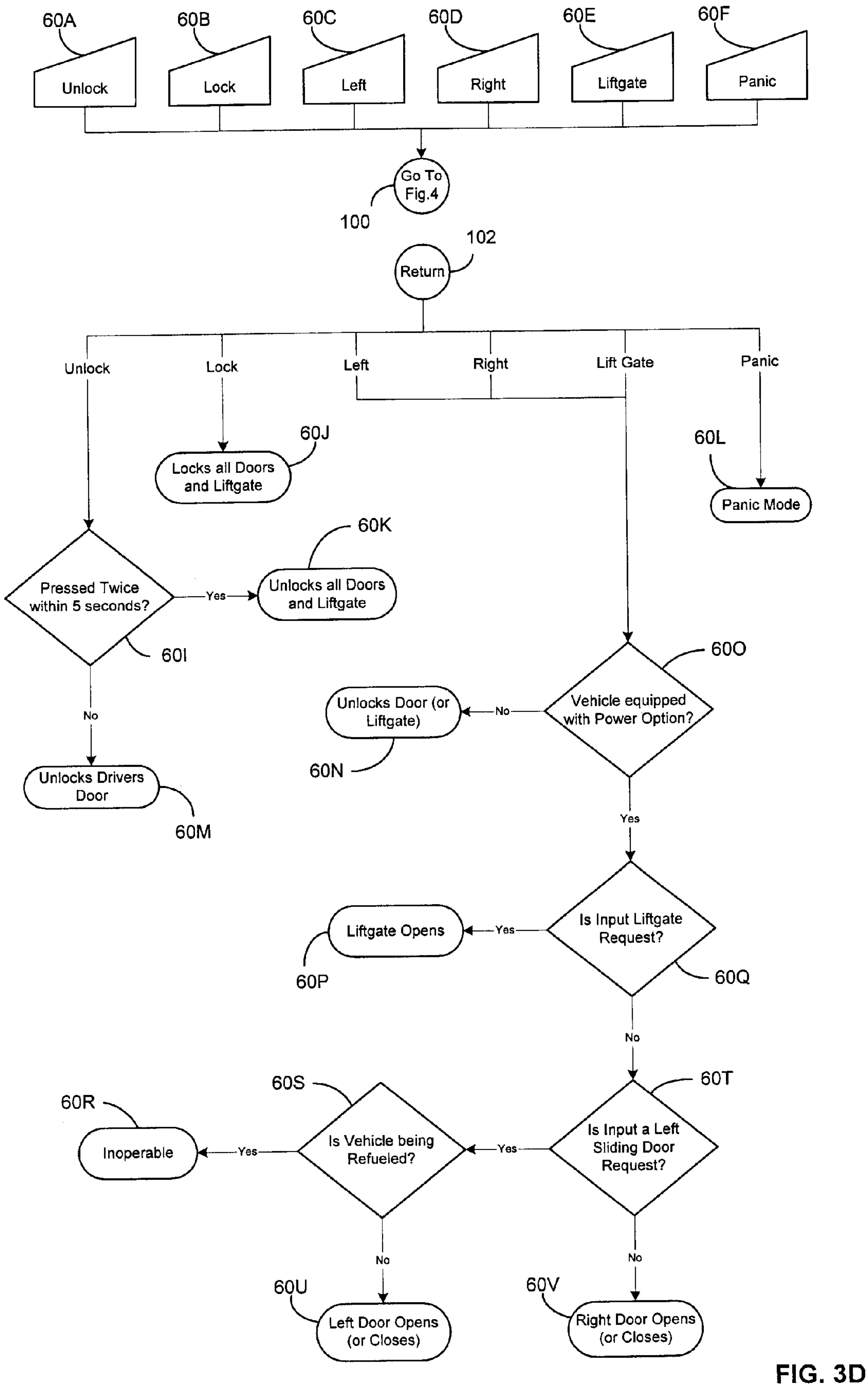
FIG. 3D is a process flow diagram of the electronic control system of the present invention showing a method for operating power sliding doors and a power liftgate in an automobile utilizing the remote keyless entry user Input device.
Figure 4:
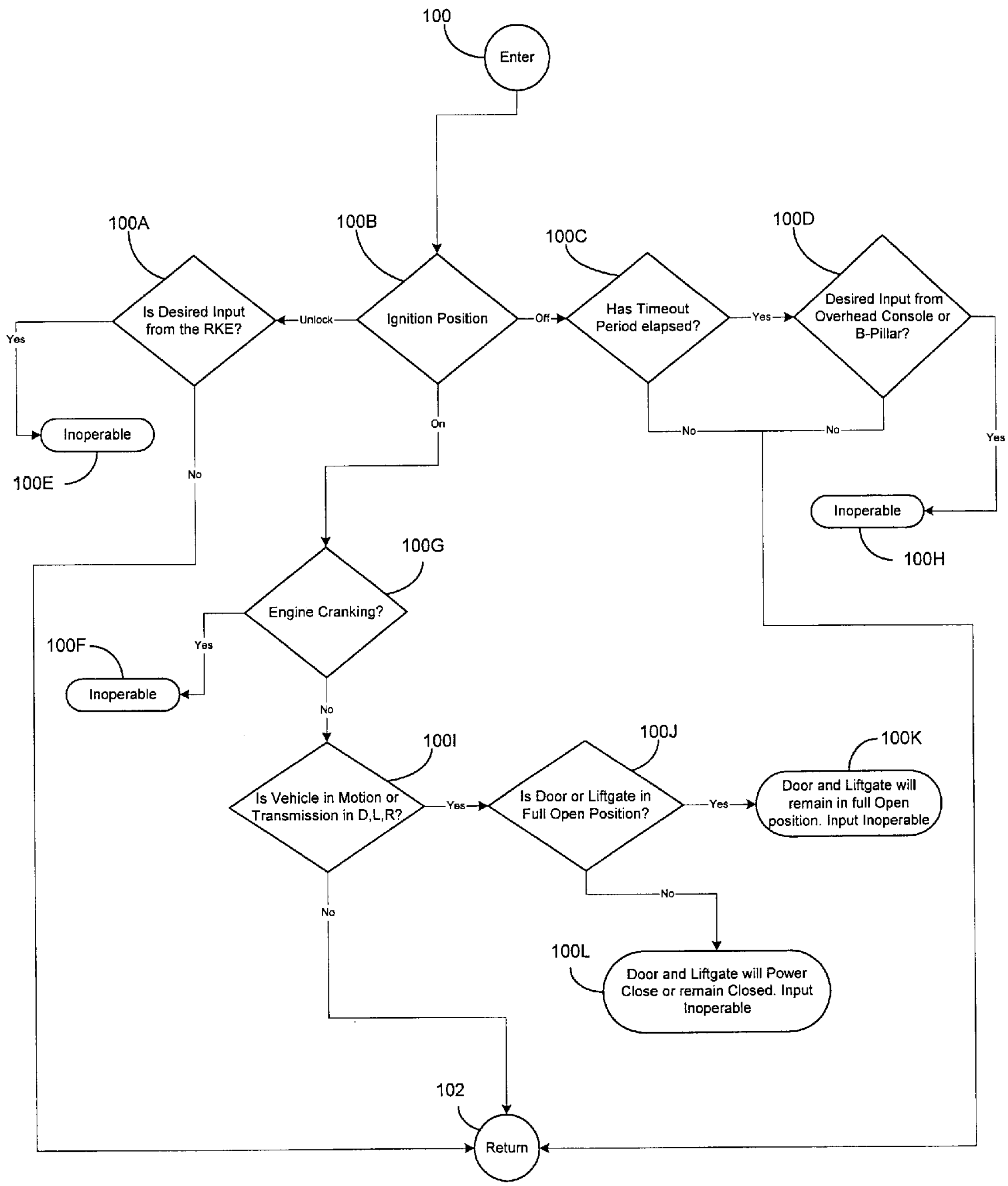
FIG. 4 is a process flow diagram of the electronic control system of the present invention showing the possible effect of the ignition position on requests from the overhead console, B-pillar and remote keyless entry modes of user input.

The process flow diagrams in FIGS. 3A, 3B, 3C, 3D and FIG. 4 illustrate the method used by the control system 10 to make a determination of what action is proper in response to the request. FIG. 3A is a representation of the decision process when the activation request comes from an overhead console switch 20. FIGS. 3B, 3C and 3D represent activation requests from the switches at the B-pillar 22, liftgate handle 28 and RKE system 24, respectively. The overhead console switches 20 consist of inputs for left sliding door 20A, right sliding door 20B, liftgate 20C and lockout 20D. The B-pillar switches include inputs for the left sliding door 22A and the right sliding door 22B. The liftgate switch 28 is a single input by means of the liftgate handle 68A and controls only the liftgate operation. The RKE system 24 contains inputs for the left and right sliding doors, the liftgate, and door locks. FIG. 4 is a representation of the possible effect of the ignition position on activation requests from the overhead console, B-pillar and remote keyless entry modes of user input.

After receiving the activation request message from the BCM 12, the PSDM 14 or PLGM 16 makes a determination of what action in response to the message will take place. The PSDM's 14 or PLGM's 16 determination is based upon the state of the several vehicle systems and conditions that the PSDM 14 or PLGM 16 either control or monitor; that is, as appropriate, the PSDM 14 or PLGM 16 determines that it will respond to the message and how it will respond or that it will deliberately ignore the message based upon the state of the vehicle at that time. In the case of a sliding door activation request, for example, if the PSDM 14 determines that the sliding door activation request (e.g., open or close) will be carried out, it broadcasts an in-frame response back to the BCM 12. When the BCM 12 receives the PSDM's 14 response, the BCM 12 causes a chime 54 to ring three times to thereby indicate to the vehicle occupants that a sliding door is operating (e.g., opening or closing, as the case may be). Similarly, the PLGM 16 responds to the BCM 12 when it determines that it will carry out a power liftgate activation request.

Should multiple power sliding door and/or power liftgate opening or closing requests be made in quick succession by the user, the PSDM 14 and PLGM 16 are operable to undertake the requests at a staggered time interval, thus preventing a possible overload condition in the vehicle electronics.

The PSDM 14 reads inputs from the following switches and sensors: the primary latch switch 32, the secondary latch switch 34, the child lock switch 40, the end of travel switch 42, the lock status switch 36, the sliding door handle switch 38 and the Hall effects sensor 46. The PSDM 14 then enables the vehicle components (e.g., the power sliding door motors and drive clutch 48, 50, 52) necessary to open, close or inhibit operation of the sliding door as required.

The PLGM 16 reads inputs from the following switches and sensors: the primary latch switch 64, the secondary latch switch 66, the end of travel switch 70, and the Hall effects sensor 74. The PLGM 16 then enables the vehicle components (e.g., the power liftgate motors and motor drive clutch 76, 78, 80) necessary to open, close or inhibit operation of the liftgate as required.

The decision process for an activation request from the liftgate handle is illustrated in FIG. 3C. The process flow diagram begins at the input request 68A and proceeds first to the"Engine Cranking?" block 68B wherein it must be determined if the vehicle is attempting to be started at that time. An affirmative answer results in an inoperable input as shown in block 68C. If the engine is not cranking at the time of the activation request the inquiry becomes whether the vehicle is in motion or if the transmission is in drive, low or reverse, as shown in block 68D. if the answer is yes, control system 10 will want to know the status of the sliding doors and liftgate, in block 68E. If the door or liftgate is in full open position, it will remain open and the input will be inoperable, shown by block 68F. Alternatively, if the door or liftgate is moving it will close, or if its in the closed position it will remain closed and the input will be inoperable, as indicated in block 68G. If the vehicle is not moving, or the transmission is in park or neutral, the input request proceeds to the "Is Liftgate in Closed Position?" block 68H. If the answer is to this question is no, the request continues on through the flowchart. If the answer is yes, the request proceeds to the "Is Liftgate Locked?" block 68I. If the liftgate is locked, the input request moves on to the terminator block 68J, which states that the liftgate handle is inoperable. If the liftgate is not locked the request ends at the terminator block 68K, which states that the liftgate functions manually.

Continuing from block 68H, assuming the liftgate was not in the closed position, the input request will move on to the "is Lift Gate in Open Position?" decision block 68L. If the liftgate is in the open position, the outside liftgate handle would not be a feasible input. The liftgate must either be closed manually, or automatically through an input at the overhead console switches 20 or the RKE system 24. If the liftgate is not in the closed position or the open position, the system will want to know if the liftgate is in the process of opening or closing, block 68N. If the liftgate is in the process of opening when the request was made, the lift gate will function manually, block 68O. If the liftgate was in the process of closing at the time of the request, it will reverse direction and open automatically, as stated in block 68P. The liftgate may also be controlled by a request from the overhead console 20, illustrated in blocks 20M and 20L, B-pillar 22, illustrated in blocks 22G and 22H, and the RKE system 24, illustrated in blocks 60Q and 60P.

The vehicle sliding door must be unlocked in order to open in response to a sliding door activation request initiated from the B-pillar 22 switches. For example, if the BCM 12 broadcasts a message to the PSDM 14 corresponding to an activation request from the B-pillar switches 22 for a power sliding door that is closed and locked, the PSDM 14 reads the lock switch 36 input that the door is locked. Subsequently, the PSDM 14 inhibits any attempt to open the sliding door.

According to the method of the present invention, however, the foregoing does not hold true with respect to sliding door or liftgate activation requests initiated by either the overhead console 20 or the RKE system 24. In the case of a sliding door activation request that is initiated by either the overhead console 20 or the RKE system 24, the BCM 12 first insures that the selected sliding door is unlocked. The BCM 12 reads the input from the primary latch switch 32 to determine if the sliding door is closed or ajar. If the primary latch switch 32 indicates that the door is closed, the BCM 12 activates the door lock motor 62 on that door's side of the vehicle to insure that the door is unlocked. If the primary latch switch 32 indicates that the door is ajar, no such door lock motor activation is initiated. The BCM 12 then broadcasts the sliding door activation request message to the PSDM 14 as previously described. Again, the PSDM 14 determines if the action requested is to be carried out.

The control system 10 is disabled during engine cranking. This feature is illustrated in FIG. 4. After determining that the ignition switch is in the "on" position at block 100B, the process flow next moves to block 100G where it must be determined if the engine is cranking. If the answer is yes, an input made during the engine cranking will result in the request not being carried out, as shown in the diagram in block 100F. If a power sliding door or liftgate is in motion at the time the engine is cranking, motion of the door or liftgate ceases until after engine cranking, at which time it is then resumed.

An input from the overhead console lockout switch will either enable or disable the lockout, depending on the position of the latching switch before the input was made. This is shown in the decision block 20G and the terminators for lockout enabled 20H and disabled 20J. If the BCM 12 reads that the lockout switch of the overhead console 20 is enabled, the BCM 12 prohibits delivery of accessory activation messages to the PSDM 14 and PLGM 16 that originate from either the overhead console switches 20 or the B-pillar switches 22. This feature is shown in FIG. 3A blocks 20F and 20E for the overhead console inputs and in FIG. 3B blocks 22D and 22C for the B-pillar inputs. However, enabling of the overhead console 20 lockout switch does not inhibit operation of the RKE system 24 and power sliding door or power liftgate activation messages to the BCM 12 originating from the RKE receiver 58 are broadcast to the PSDM 14 and PLGM 16 to be carried out.

The PSDM 14 and PLGM 16 read the ignition switch 30 status from the BCM 12 over the J1850 data bus 18. The ignition switch status can include "on," "off" and "steering column unlock," as illustrated by the ignition status block 100B in FIG. 4. When the ignition is off, the process flow diagram block 100C inquires as to whether the timeout period has elapsed, as measured from when the ignition was turned from the on position, and if so, whether the input came from one of the interior inputs 100D. If the timeout period has not elapsed or the input was not from the overhead console or B pillar, the path continues on to the FIG. 4 Return block 102. If the timeout period has elapsed and the input was from an internal switch, then the input is inoperable 100H. When the ignition is on, and the EATX 28 broadcasts on the J1850 data bus 18 that the automatic transmission is in a position other than park or neutral, the PSDM 14 does not enable the power sliding door(s) to be opened and the PLGM 16 does not enable operation of the power liftgate. This result is shown by following block 100I to 100J and then to one of the terminator blocks, 100K or 100L, of FIG. 4. If the transmission is in park or neutral, the PSDM 14 and PLGM 16 enable the power sliding door(s) and liftgate to open, provided that the distance pulses being transmitted by the SBEC 26 indicate that the vehicle is not moving, as illustrated by following the "no" line from block 100I in FIG. 4. If the sliding door or liftgate is already in the full open position when the vehicle is shifted out of park or neutral or the vehicle speed is caused to be greater than zero, the PSDM 14 and PLGM 16, respectively, inhibit operation of the power sliding door and power liftgate so that the door and liftgate remain in the full open position, as seen in terminator block 100K of FIG. 4. However, if the door or liftgate is in the process of opening under power, and the vehicle is shifted out of park or neutral or the vehicle speed is caused to be greater than zero, the PSDM 14 and PLGM 16, respectively, inhibits operation of the power sliding door and power liftgate so that the door and liftgate reverse and power close. This feature is illustrated in terminator block 100L of FIG. 4. If the sliding door or liftgate is in the process of closing under power when the vehicle is shifted out of park or neutral or the vehicle speed is caused to be greater than zero, the PSDM 14 and PLGM 16, respectively, allow operation of the power sliding door and power liftgate to continue so that the door and liftgate power close, also shown in 100L.

The PSDM 14 also inhibits the left power sliding door from opening during fueling by using a conventional mechanical lock mechanism. The process flow diagram for the overhead control panel illustrates this feature beginning at block 20P. If the activation request is for the right power sliding door it will open or close, depending on its status before the request, as shown in block 20R. If the activation request was for the left door, the flow diagram proceeds to block 20O where it is determined if the vehicle is being fueled. If the answer is no, the door will open or close as appropriate, illustrated in block 20Q. If the vehicle is being fueled, block 20N shows that the input will be inoperable and the door will remain closed 20N. The same process is used when the request originates from the B-Pillar 22, blocks 22I through 22M, or the RKE system 24, block 60R through 60V.

Operation of the control system 10 by input from the RKE system 24 is described as follows. By depressing the appropriate button on the RKE transmitter 56, the user initiates actuation of a power sliding door or power liftgate function via the RKE system 24. The RKE transmitter 56 transmits the actuation request which is received by the RKE receiver 58. The RKE receiver 58 decodes a transmitted message (e.g., in the form of a serial data string) from the RKE transmitter 56. Upon determining that the RKE transmitter 56 is validly programmed to the RKE receiver 58, the RKE receiver 58 sends a serial data stream message to the BCM 12. The data stream message can take a well-known form, such as a modulated signal comprising a wake-up signal, the output function desired to be performed, and a transmitter identification, for example. The RKE receiver 58 is capable of learning up to four individual transmitter vehicle access codes (VACs) and will store them in its EEPROM memory during its programming mode.

The BCM monitors the states of the ignition switch and the vehicle transmission via the J1850 data bus. When the ignition is in the "on" position and the vehicle is not in park, as indicated by the EATX, the BCM may inhibit the activation of the power sliding doors and power liftgate functions initiated by an actuation input from the RKE system. Also, the RKE system functions are inhibited by the BCM if the ignition switch is in the "steering column unlock" position and no status communications are detected by the BCM from the EATX. This feature is illustrated in FIG. 4 beginning at the ignition position block 100B and following "Unlock" path to block 100A. If the input is not from the RKE system 24 the process flow diagram is followed to the return block 102. If the input originates from the RKE system 24, then the diagram is followed to the terminator block 100E, showing the input as inoperable.

The function of the six input buttons 60 included on the RKE transmitter 56, can generally be categorized as LEFT, RIGHT, LIFTGATE, UNLOCK, LOCK and PANIC. Greater detail is provided in the table below.

| RKE Function | Button(s) Depressed |
|---|---|
| Unlock Driver's Side Doors | Unlock (Pressed Once) |
| Unlock All Doors & Liftgate | Unlock (Pressed Twice within 5 seconds) |
| Lock All Doors & Liftgate | Lock (Pressed Once) |
| Unlock Left Side Doors and Open Power Sliding Door if Closed; or Close Power Sliding Door if Open | Left (Pressed Once) |
| Unlock Right Side and Open Power Sliding Door if Closed; or Close Power Sliding Door if Open | Right (Pressed Once) |
| Unlock Lift Gate and Open Power Liftgate if Closed; or Close Power Liftgate if Open | Liftgate (Pressed Once) |
| Panic Mode | Panic |

The RKE system is illustrated in the process flow diagram in FIG. 3D. The six activation request blocks are labeled as: Unlock 60A, Lock 60B, Left 60C, Right 60D, Liftgate 60E and Panic 60F. The Unlock input 60A produces a different result if pressed twice within five seconds, as illustrated by block 60I. One press of the button will unlock only the drivers door, block 60M, and pressing the button twice will unlock all doors and the liftgate, block 60K. The Lock input 60B will lock all doors and the liftgate, as illustrated by block 60J. The panic input will result in the vehicle entering the panic mode, as shown by block 60L.

All the vehicles manufactured, however, do not have the identical convenience accessory options. For example, in a minivan, the potential accessory options include left and/or right side power sliding doors and/or a power liftgate. Since the RKE system of the present invention is intended to accommodate all the various combinations of power sliding door and power liftgate options as well as other accessories common to all vehicles, such as power locks, horn, lights and panic alarm, each input button 60 performs a logical operation on the vehicle, despite the combination of convenience accessories that it possesses.

Consequently, in the absence of a power sliding door on either the left or right side of the vehicle, the LEFT and RIGHT input buttons 60 will merely operate to unlock doors on the left and right sides of the vehicle, respectively. Similarly, with respect to the power liftgate accessory, if this feature is not included on the vehicle, the LIFTGATE input button 60 will only unlock the liftgate. These features are illustrated in FIG. 3D, following the door or liftgate activation requests, 60C, 60D and 60E, to block 60O. If the vehicle is equipped with the power accessory that has been requested, the process becomes the same as door or liftgate inputs from the overhead console. If the vehicle does not possess the accessory requested, the diagram is followed to block 60N, which indicates that the door or lift gate will be unlocked.

The present invention has been described in an illustrative manner. It should be understood that the terminology which has been used is intended to be in the nature of words of description rather than of limitation. Many modifications or variations to the present invention are possible in light of the above teachings. Therefore, within the scope of the following claims, the present invention may be practiced otherwise than as specifically described.

What is claimed is:

1. An electronic control system for controlling the operation of a power liftgate and at least one power sliding door in a minivan, said control system comprising;

a user input interface for producing at least one of a power sliding door actuation signal and a power liftgate actuation signal, said user input interface comprising at least one overhead console switch, at least one B-pillar switch, and a RKE system;

a first control module for receiving one of said power sliding door actuation signal or said power liftgate actuation signal from said user input interface, interpreting said actuation signal, determining an action in response to said actuation signal and broadcasting an actuation message in response to said actuation signal;

a liftgate control module for receiving said actuation message from said first control module, monitoring a plurality of status inputs in determining an action in response to said actuation message and controlling the operation of a plurality of devices for directing the movement of said power liftgate; and a communications network between said first control module and said liftgate control module, said communications network comprising a serial data bus.

2. The electronic control system of claim 1, wherein said plurality of status inputs are provided by an engine controller, a transmission controller, an ignition switch, a primary latch switch, a secondary latch switch, an outside door handle switch, an end of travel switch, a tape switch and a Hall effects sensor.

3. The electronic control system of claim 1, wherein said plurality of devices is comprising a power liftgate motor, a cinching motor and an engage/disengage clutch.

4. The electronic control system of claim 1, wherein said RKE system is comprising a RKE transmitter and a RKE receiver, and wherein said RKE transmitter transmits a radio frequency signal to said RKE receiver.

5. The electronic control system of claim 4, wherein said RKE transmitter and said first control module communicate by a serial data connection.

6. The electronic control system of claim 1 further comprising:

a sliding door control module for receiving said actuation message from said first control module, monitoring a plurality of status inputs and determining an action in response to said actuation message for controlling the operation of a second plurality of devices for directing the movement of at least one of said power sliding doors.

7. A method for controlling the operation of a power liftgate and at least one power sliding door in a minivan, said method comprising:

monitoring a user input interface for a change of state in a first control module comprising monitoring overhead console switches, B-pillar switches and a RKE system;

producing at least one of a power liftgate actuation signal and a power sliding door actuation signal in response to a user request in said user input interface;

receiving one of said power liftgate actuation signal or said power sliding door actuation signal from said user input interface in a first control module;

interpreting said actuation signal in said first control module;

determining an action in response to said actuation signal in said first control module;

broadcasting an actuation message by said first control module;

receiving an actuation message from said first control module in a liftgate control module;

monitoring a plurality of status inputs in said liftgate control module;

determining an action in response to said actuation message in said liftgate control module; and directing the movement of said liftgate by said liftgate control module utilizing a plurality of motors.

8. The method of claim 7 wherein said monitoring a plurality of status inputs in said liftgate control module comprises monitoring status inputs from an engine controller, a transmission controller, an ignition switch, a primary latch switch, a secondary latch switch, an outside door handle switch, an end of travel switch, a tape switch and a Hall effects sensor.

9. The method of claim 8 wherein said plurality of motors comprises a power liftgate motor, a cinching motor and an engage/disengage clutch.

10. The method of claim 9 wherein said determining an action in response to said actuation message in said liftgate control module comprises disregarding an activation input originating from said user input interface when a first status input is received from said ignition switch, said gear position monitored from said transmission controller indicates that said minivan is in park or neutral and said speed pulses monitored from said engine controller indicate that said minivan is moving.

11. The method of claim 9 wherein said determining an action in response to said actuation message in said liftgate control module comprises disregarding an activation input originating from said user input interface when a first status in put is received from said ignition switch and said gear position monitored from said transmission controller indicates that said minivan is not in park or neutral.

12. The method of claim 9 wherein said directing the movement of said power liftgate by said liftgate control module comprises disengaging the power liftgate motor when a first status input is monitored from said outside door handle switch.

13. The method of claim 9 wherein said directing the movement of said power liftgate by said liftgate control module comprises stopping the motion of said power liftgate and shutting said power liftgate when a first status input is monitored from said end of travel switch.

14. The method of claim 9 wherein said directing the movement of said power liftgate by said liftgate control module comprises stopping and shutting down said power cinching motor when a first status input is monitored from said primary latch switch.

15. The method of claim 9 wherein said directing the movement of said power liftgate by said liftgate control module comprises disengaging said power liftgate motor and activating said power cinching motor when a first status input is monitored from said secondary latch switch.

16. The method of claim 9 wherein said directing the movement of said power liftgate by said liftgate control module comprises stopping and reversing the direction of travel of said power liftgate when a first status input is monitored from said tape switch.

17. The method of claim 9 wherein said directing the movement of said power liftgate by said liftgate control module comprises controlling the position and speed of said power liftgate when a first status input is monitored from said Hall effects sensor.

18. The method of claim 7 further comprising the steps of:

receiving an actuation message from said first control module in a sliding door control module;

monitoring a plurality of status inputs in said sliding door control module;

determining an action in response to said actuation message in said sliding door control module; and directing the movement of at least one of said power sliding doors by said sliding door control module utilizing a second plurality of motors.

* * * * *